United States Patent [19]
Lefebvre et al.

[11] Patent Number: 5,707,026
[45] Date of Patent: Jan. 13, 1998

[54] PROCESS FOR PILOTING AN AIRCRAFT TO IMPROVE MICROGRAVITY STATE AND CORRESPONDING SYSTEM

[75] Inventors: Luc Lefebvre, Toulouse; Flavien Mercier, Ramonville St Agne, both of France

[73] Assignee: Centre National D'Etudes Spatiales, Paris, France

[21] Appl. No.: 454,133

[22] PCT Filed: Dec. 6, 1993

[86] PCT No.: PCT/FR93/01199

§ 371 Date: Dec. 18, 1995

§ 102(e) Date: Dec. 18, 1995

[87] PCT Pub. No.: WO94/13532

PCT Pub. Date: Jun. 23, 1994

[30] Foreign Application Priority Data

Dec. 8, 1992 [FR] France ................................. 92 14757

[51] Int. Cl.[6] .................................................. B64C 13/16
[52] U.S. Cl. ........................ 244/1 R; 244/195; 117/901
[58] Field of Search ........................... 244/1 R, 191, 244/194, 195, 164, 159, 158 R; 171/901; 435/240.25, 240.41, 243, 173.8, 289.1

[56] References Cited

U.S. PATENT DOCUMENTS

| | | | |
|---|---|---|---|
| 3,077,557 | 2/1963 | Joline et al. | 244/191 |
| 4,408,740 | 10/1983 | Kleber | 244/164 |
| 5,020,743 | 6/1991 | von Burn et al. | 244/159 |
| 5,093,260 | 3/1992 | Mesland | 244/1 R |
| 5,243,544 | 9/1993 | Schoess | 244/158 R |
| 5,427,335 | 6/1995 | Sanders et al. | 244/158 R |

*Primary Examiner*—Galen L. Barefoot
*Attorney, Agent, or Firm*—Burns, Doane, Swecker & Mathis, LLP

[57] ABSTRACT

Process for piloting an aircraft in order to improve a microgravity state and the corresponding system.

Instead of supplying the pilot with an information linked with the instantaneous position of the equipment in free floating form (M), he is supplied with an information relative to the anticipated position of said equipment.

Application to microgravity studies.

9 Claims, 3 Drawing Sheets

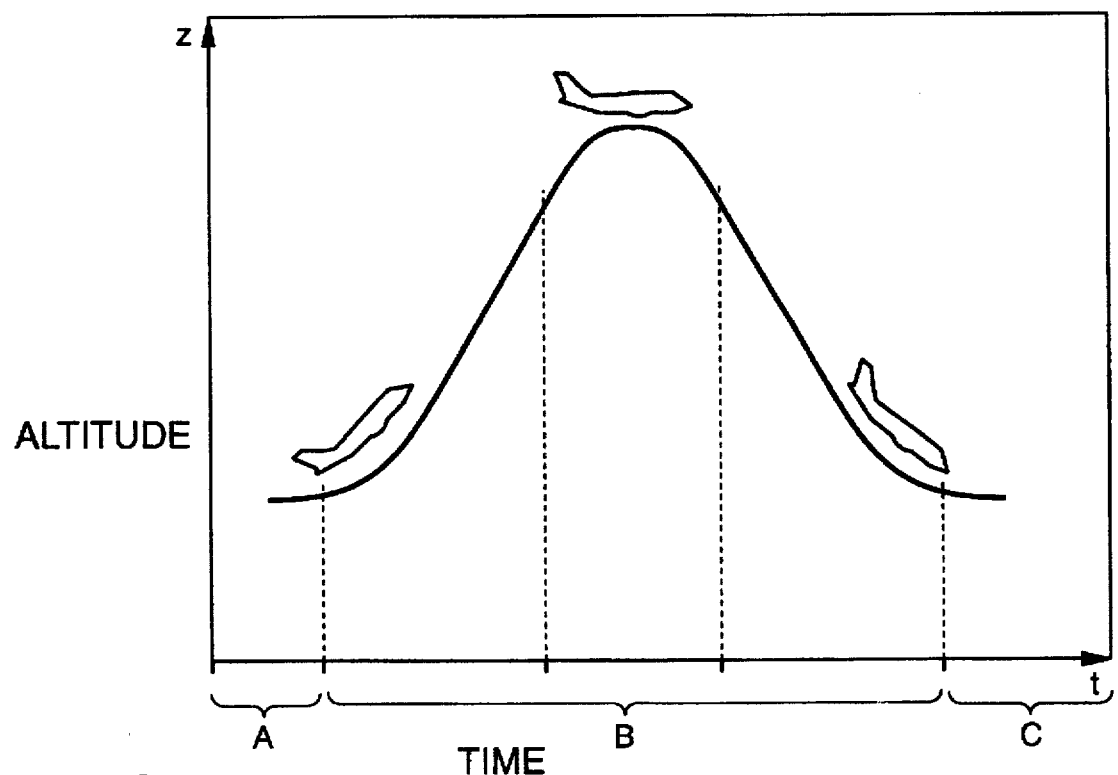
FIG._1
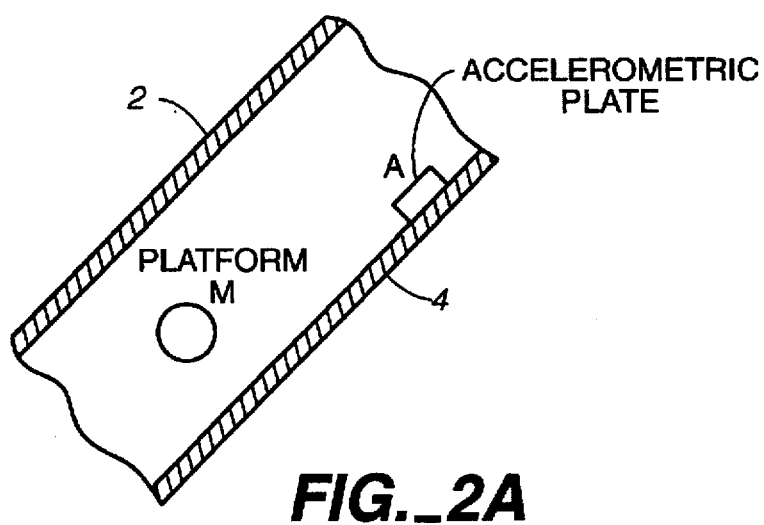
FIG._2A
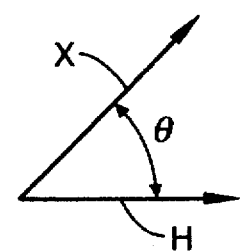
FIG._2B

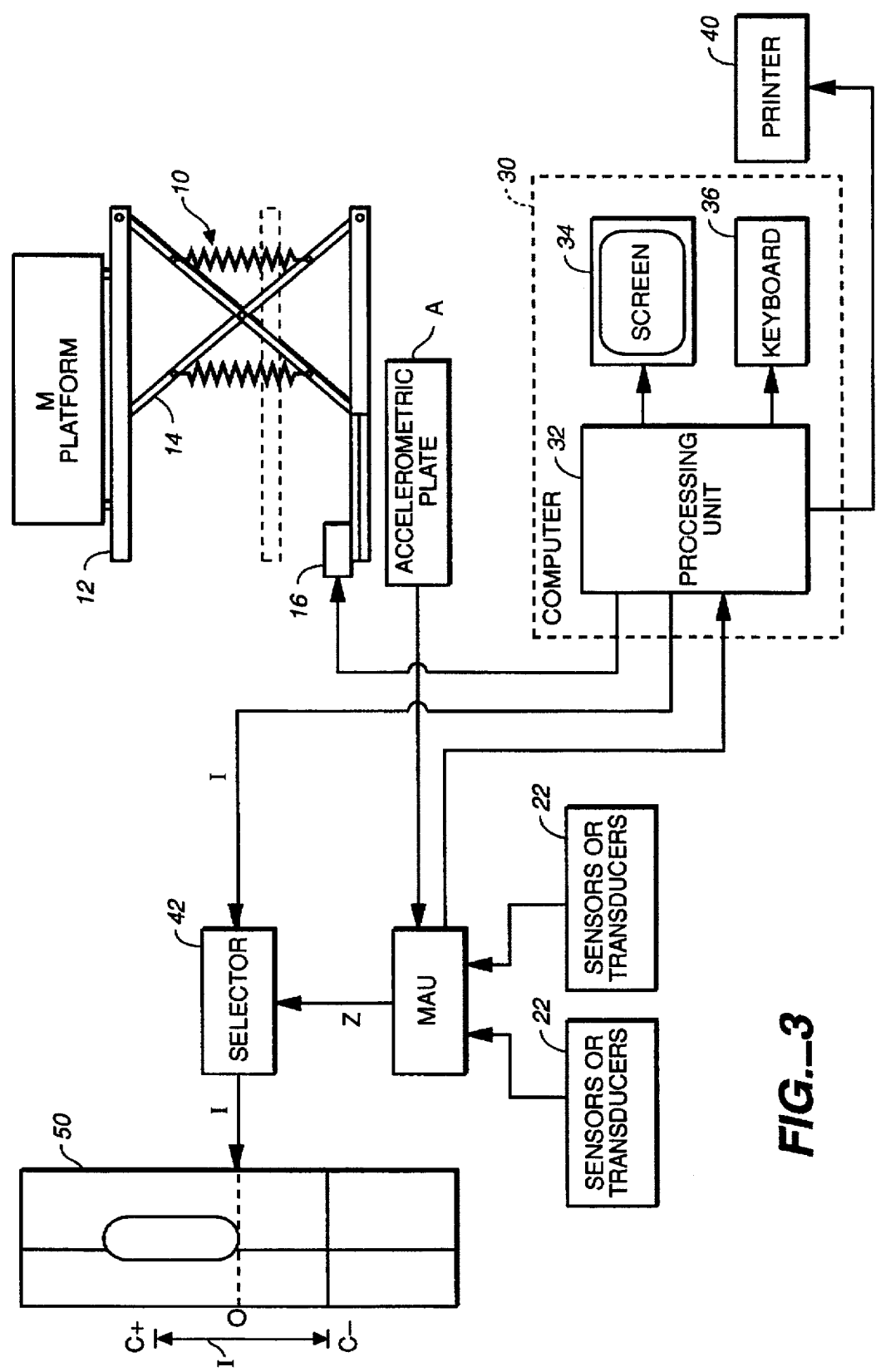
FIG._3

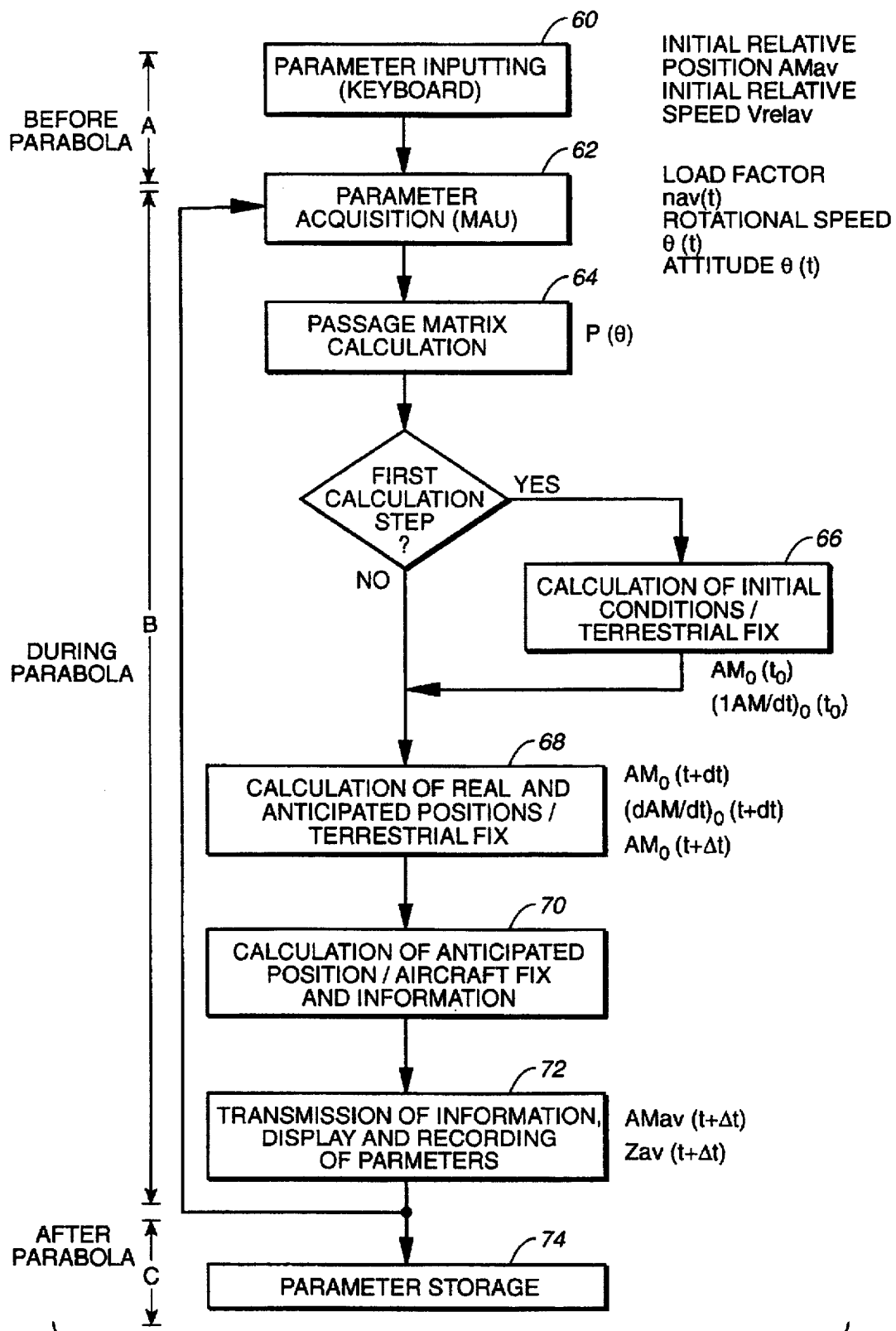
FIG._4

PROCESS FOR PILOTING AN AIRCRAFT TO IMPROVE MICROGRAVITY STATE AND CORRESPONDING SYSTEM

DESCRIPTION

1. Technical Field

The present invention relates to a process for piloting or flying an aircraft in order to improve a microgravity state and a corresponding system. Its applications are those of microgravity; the science of materials, the science of life, equipment tests for use in astronautics, etc.

2. Prior Art

It is known that it is possible to artificially create a very low gravity level within an aircraft by placing the latter on a free fall trajectory, or in other words by performing a ballistic flight.

FIG. 1 diagrammatically shows such a trajectory z(t). Starting with a level flight the aircraft is accelerated and then an entry pull-up is imposed thereon. The lift is then cancelled out and the thrust reduced in order to compensate drag. The aircraft then describes an ellipse segment of a theoretical nature, which could be likened to a parabola. At the end of the parabola, the aircraft undergoes an exit pull-up.

In order to prevent any contact between the equipment where microgravity experiments have to be performed and the aircraft cabin, it is known to release the equipment in the cabin at the start of the parabolic phase and it is then allowed to evolve in free floating form.

In order to adapt the aircraft trajectory, the pilot is supplied with information allowing him to correct the flight in such a way that the equipment remains in free floating form. A first solution is obtained by filming the equipment and displaying its image in the cockpit. The pilot is then able to correct the trajectory of his aircraft as a function of the instantaneous position of the equipment.

With this method, the microgravity level reached in such flights scarcely drops below $10^{-3}$ g, which is often very inadequate. Moreover, this method is unstable as a result of the aircraft response time.

DESCRIPTION OF THE INVENTION

The object of the present invention is to obviate these disadvantages. To this end, it proposes a process for piloting or flying an aircraft making it possible to perform free floating sequences of at least 10 seconds and reach much better microgravity levels of approximately $10^{-4}$ to $10^{-6}$ g.

These objectives are achieved as a result of a particular choice of the information supplied to the pilot for the purposes of correcting the trajectory. This information is the vertical component of the relative position of the aircraft, which is no longer instantaneous, but instead anticipated. This anticipation which, in practice is a few seconds, enables the pilot to anticipate the trajectory correction. Thus, freedom is obtained from the aircraft response time and certain piloting instabilities are avoided.

More specifically, the present invention relates to a process for piloting an aircraft in order to improve a microgravity state, in which:

the aircraft is given a substantially ballistic trajectory, within the aircraft, equipment to be placed in a microgravity state is released, information is processed on the basis of the position occupied by said equipment relative to the aircraft, the aircraft trajectory is corrected as a function of this information, said process being characterized in that the information processed is the vertical component of the anticipated relative position of the equipment, the anticipation time being determined and regulatable.

It is also possible to calculate the vertical component of the anticipated relative position of the equipment on the basis of release conditions for said equipment and aircraft flying parameters.

Advantageously, it is also possible to process second information, which is the longitudinal component of the anticipated relative position of the equipment.

It is also possible to process third information, which is the transverse component of the anticipated relative position of the equipment.

The present invention is not limited to the manual piloting or flying of an aircraft. It can also be applied in the case of automatic piloting. In this case, the calculated information, which, according to the invention, consists of the vertical component of the anticipated position, is compared with a reference value and the difference between the calculated information and the reference constitutes an error signal used for automatically correcting the control of the aircraft.

The present invention also relates to a piloting system utilizing the process defined hereinbefore. This system comprises:

means for releasing in the aircraft equipment to be brought into a microgravity state, means for processing information on the basis of the position occupied by said equipment relative to the aircraft and for displaying this information in the cockpit, said system being characterized in that the means for processing the information are able to calculate the vertical component of the anticipated relative position of the equipment, the anticipation time being determined and regulatable.

In the above definitions, the term "aircraft" applies to any type of equipment able to travel in the air.

Throughout the present description and for simplification purposes, a standard aircraft will be assumed and the equipment released in the cabin is a platform.

BRIEF DESCRIPTION OF THE DRAWINGS

FIG. 1, already described, shows the trajectory of an aircraft making it possible to artificially cream a microgravity state.

FIGS. 2A and 2B diagrammatically define a reference mark with respect to the aircraft.

FIG. 3 shows means for performing the process of the invention.

FIG. 4 is an organization chart for calculating the information to be transmitted.

DETAILED DESCRIPTION OF THE PREFERRED EMBODIMENTS

FIG. 2A diagrammatically shows the walls 2 and 4 of the aircraft, an assumed circular platform M and an accelerometric plate A integral with the wall 4. FIG. 2B shows the longitudinal reference axis X, which is the aircraft axis and which forms an angle $\Theta$ with the horizon H. The angle $\Theta$ is the attitude of the aircraft.

FIG. 3 illustrates a system making it possible to perform the process of the invention. It firstly comprises a mechanical release system 10 constituted by a plate 12 supporting a platform M, two crossed, articulated arms 14 making it possible to regulate the initial position of the platform M and an ejection device able to give it an initial speed and a control panel 16. The system shown also incorporates an accelerometric plate A (there can be several of these).

The system shown also incorporates a mixed acquisition unit (MAU) connected to various sensors or transducers 22 (gyroscopic units, gyrometric units, etc.) and to the accelerometric plate A. It also has a computer 30 with a processing unit 32, a screen 34 and a keyboard 36. The processing unit 32 receives a message from the mixed acquisition unit MAU. This processing unit 32 also has an acquisition card for information received from the MAU and which relate to the aircraft and its piloting characteristics. It also has a digital-analog conversion card supplying the information calculated in analog form, as well as a digital control card of the release system. The computer can also be linked with a printer 40.

Optionally and for security reasons, a selector 42 has two inputs respectively connected to the MAU from which it directly receives the acceleration signal Z and to the processing unit 32, from which it receives either the new acceleration Z or the anticipated information I. This selector 42 has an output carrying either an acceleration Z or the information I.

Finally, the system has a device 50, which displays the information I or Z. This device is preferably analog and can have light-emitting diodes and two cursors $C^+$, $C^-$. The information I or the acceleration Z (because the same indicator is involved) then appears like a strip, whose height indicates the value. Any other display device can be envisaged. It is in particular possible to use simulation means or digital display means.

The expert will know how to calculate the anticipated position of the platform M either on the basis of position measurements, or on the basis of calculations. In a purely explanatory manner a description will now be given of how the processing unit 32 can determine the anticipated information. The following conventions are used:

the index O is allocated to a quantity relative to a terrestrial mark or fix, the index "av" is allocated to a quantity relative to a mark or fix linked with the aircraft.

When the platform M is in free floating form it is possible to write: $\gamma_{s\,o}(M) = g$. Moreover, we obtain $\gamma_0(A) = g + n_0 g$, with $n_0 = P(\Theta)$. $n_{av}$, which $P(\Theta)$ is the matrix of passage from the aircraft fix to the terrestrial fix, which is a function of $\Theta$. $\Theta$ is the attitude of the aircraft required in real time. $N_{av}$ is the load factor given by the accelerometric plate A acquired in real time, so that $\gamma_0(M) - \gamma_0(A) = -n_0 \cdot g$, i.e. $(d^2(AM)/dt^2)_0 = -n_0 \cdot g$. Thus, X, Y and Z are the coordinates of AM and $n_x$, $n_y$, $n_z$ are the coordinates of n, so that the following system is obtained:

$X"_0(t) = -n_{xo}(t) \cdot g$, $Y"_0(t) = -n_{yo}(t) \cdot g$, $Z"_0(t) = -n_{zo}(t) \cdot g$.

Assuming that $n_{xo}$ and $n_{zo}$ remain constant during a time step dt, it is possible to write:

$X_0(t+dt) = X_0(t) + X'_0(t) \cdot dt + 1/2 X"_0(t) \cdot dt^2$ then $X'_0(t+dt) = X'_0(t) + X"_0(t) \cdot dt$, $Y_0(t+dt) = Y_0(t) + Y'_0(t) \cdot dt + 1/2 Y"_0(t) \cdot dt^2$ then $Y'_0(t+dt) = Y'_0(t) + Y"_0(t) \cdot dt$, $Z_0(t+dt) = Z_0(t) + Z'_0(t) \cdot dt + 1/2 Z"_0(t) \cdot dt^2$ then $Z'_0(t+dt) = Z'_0(t+dt) + Z"_0(t) \cdot dt$.

It is then possible to write:

$AM_{av}(t+dt) = P^{-1}(\Theta(t+dt)) \cdot AM_0(t+dt)$, with: $\Theta(t+dt) = \Theta(t) + \Theta'(t) \cdot dt$, in which $\Theta$ is the rotational speed of the aircraft acquired in real time.

Thus, this algorithm makes it possible to obtain the trajectory of the platform in the aircraft, but others could be conceived.

Assuming now that $n_{xo}$, $n_{yo}$ and $n_{zo}$ remain constant during a time $\Delta t$, it is possible to write:

$X_0(t+\Delta t) = X_0(t) + X'_0(t) \cdot \Delta t + 1/2 X"_0(t) \cdot \Delta t^2$, $Y_0(t+\Delta t) = Y_0(t) + Y'_0(t) \cdot \Delta t + 1/2 Y"_0(t) \cdot \Delta t^2$, $Z_0(t+\Delta t) = Z_0(t) + Z'_0(t) \cdot \Delta t + 1/2 Z"_0(g) \cdot \Delta t^2$.

one then writes:

$AM_{av}(t+\Delta t) = p^{-1}(\Theta(t+\Delta t)) \cdot AM_0(t+\Delta t)$ with $\Theta(t+\Delta t) = \Theta(t) + \Theta'(t) \cdot \Delta t$.

Thus, the anticipated relative position of the platform is obtained, but here again other algorithms are possible.

The anticipated information supplied to the pilot is $Z_{av}(t+\Delta t)$.

The initial conditions are $AM_0(t_0)$ and $(d(AM)/dt)_0(t_0)$.

It is possible to write:

$AM_0(t_0) = P(\Theta(t_0)) \cdot AM_{av}(t_0)$ with $AM_{av}(t_0)$: initial position relative to the platform and $(d(AM)/dt)_0(t_0) = V_0(M)(t) - V_0(A)(t_0) = Vrel_0(M)(t_0) + \omega_0(t_0) AM_0(t_0)$, where $Vrel_0(M)(t_0) = P(\Theta(t_0)) \cdot Vrel_{av}(M)(t_0)$ with $Vrel_{av}(M)(t_0)$: platform ejection speed, and $\omega_0(t_0) = (0, \Theta'(t_0), 0)$.

Finally, FIG. 4 is an organization chart for calculating the information $Z_{av}(t+\Delta t)$ according to the procedure described hereinbefore.

The meaning of the different blocks is as follows:

60: parameter inputting (keyboard)

62: parameter acquisition (MAU)

64: passage matrix calculation

66: calculation of initial conditions/terrestrial fix

68: calculation of real and anticipated positions/terrestrial fix

70: calculation of anticipated position/aircraft fix and information

72: transmission of information, display and recording of parameters

74: parameter storage.

Phase A precedes parabolic flight, phase B corresponds to parabolic flight and phase C follows parabolic flight.

In the preceding description, the various information are carried in conventional manner by electrical signals flowing in conductors. It would not pass outside the scope of the invention to use wireless data transmission means (microwave means, infrared means, etc.), particularly between the platform and the processing unit. By equipping the platform in this way it is possible to know its acceleration, so that a better accuracy with respect to the trajectory is obtained.

It is also possible to determine the load factor $n_{av}$ with anticipation (a few seconds) as a function of the depth control, bearing in mind that aircraft response time.

According to the invention, it is also possible to provide the system with means for compensating the initial rotational speed of the platform.

It is finally possible to give the pilot other information so that he can give the aircraft a trajectory appropriate for bringing the platform to a given position in a damped manner.

What is claimed is:

1. Process for piloting an aircraft in order to improve a microgravity state in the aircraft, comprising the steps of:
   giving the aircraft a substantially ballistic trajectory;
   releasing within the aircraft an equipment to be placed in a microgravity state;
   determining the anticipated vertical component of the anticipated relative position of the equipment relative to the aircraft at the instant t+$\Delta$t, wherein $\Delta$t is an anticipation time; and
   correcting the aircraft trajectory as a function of said anticipated vertical component.

2. Process according to claim 1, characterized in that the vertical component of the anticipated relative position of the equipment is calculated on the basis of the release conditions of the equipment and aircraft flight parameters.

3. Process according to claim 1, characterized in that also a second information is processed, which is the longitudinal component of the anticipated relative position of the equipment.

4. Process according to claim 1, characterized in that also a third information is processed, which is the transverse component of the anticipated relative position of the equipment.

5. Process according to claim 1, characterized in that the correction of the trajectory of the aircraft is performed by the aircraft pilot.

6. Process according to claim 1, characterized in that the correction of the trajectory of the aircraft takes place automatically.

7. Process according to claim 1, characterized in that the anticipation time ($\Delta$t) is a few seconds.

8. Piloting system comprising:
   means (10) for releasing in the aircraft an equipment (M) to be brought into a microgravity state;
   means for processing an information on the basis of the position occupied by said equipment (M) relative to the aircraft and for displaying said information in the cockpit; and
   said system being characterized in that means (36, MAU) for processing the information are able to calculate the vertical component ($Z_{av}$(t+$\Delta$t)) of the anticipated relative position of the equipment (M), the anticipation time ($\Delta$t) being determined and regulatable.

9. System according to claim 8, characterized in that the means for processing the information comprise at least one accelerometric plate (A), a mixed acquisition unit (MAU) connected to various sensors (22) and to the accelerometric plate (A), a computer (30) incorporating a processing unit (32) connected to the mixed acquisition unit (MAU) and a display member (50) connected to the processing unit (32).

* * * * *